(12) United States Patent
Georgeson et al.

(10) Patent No.: US 7,434,480 B2
(45) Date of Patent: *Oct. 14, 2008

(54) METHODS AND SYSTEMS FOR USING ACTIVE SURFACE COVERINGS FOR STRUCTURAL ASSESSMENT AND MONITORING

(75) Inventors: Gary E. Georgeson, Federal Way, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 92 days.

This patent is subject to a terminal disclaimer.

(21) Appl. No.: 11/302,617

(22) Filed: Dec. 14, 2005

(65) Prior Publication Data

US 2008/0223152 A1    Sep. 18, 2008

(51) Int. Cl.
*G01L 1/00* (2006.01)

(52) U.S. Cl. ..................... 73/862.041; 73/776

(58) Field of Classification Search .............. 73/767, 73/774, 776, 801, 802, 862.041, 862.046
See application file for complete search history.

(56) References Cited

U.S. PATENT DOCUMENTS

| | | | |
|---|---|---|---|
| 3,313,204 A * | 4/1967 | Oppel | 356/34 |
| 5,660,667 A | 8/1997 | Davis | |
| 5,824,391 A | 10/1998 | Davis | |
| 5,896,191 A * | 4/1999 | Beier et al. | 356/35.5 |
| 6,177,189 B1 | 1/2001 | Rawlings et al. | |
| 6,370,964 B1 * | 4/2002 | Chang et al. | 73/862.046 |
| 6,490,776 B1 | 12/2002 | Gager et al. | |
| 6,674,292 B2 | 1/2004 | Bray et al. | |
| 6,790,526 B2 | 9/2004 | Vargo et al. | |
| 6,924,439 B1 | 8/2005 | Bonni et al. | |
| 6,940,295 B2 | 9/2005 | Engelbart et al. | |
| 2002/0154029 A1 * | 10/2002 | Watters et al. | 340/870.07 |
| 2002/0190729 A1 * | 12/2002 | Wilson | 324/663 |
| 2004/0166333 A1 | 8/2004 | Byrd et al. | |
| 2005/0082467 A1 * | 4/2005 | Mossman | 250/227.16 |
| 2005/0181203 A1 | 8/2005 | Rawlings et al. | |
| 2005/0237055 A1 | 10/2005 | Sun et al. | |
| 2005/0284232 A1 * | 12/2005 | Rice | 73/762 |
| 2006/0182160 A1 * | 8/2006 | Watts et al. | 372/43.01 |
| 2007/0095160 A1 * | 5/2007 | Georgeson et al. | 73/866 |
| 2007/0100582 A1 * | 5/2007 | Griess et al. | 702/183 |

OTHER PUBLICATIONS

Xu, C., Liu, Y., Akiyama, M., Nonaka, K., Zheng, X. "Visualization of Stress Distribution in Solid by Mechanoluminescence." Proc. SPIE vol. 448, (2001): 398-407.*

(Continued)

*Primary Examiner*—Edward Lefkowitz
*Assistant Examiner*—Puman Patel
(74) *Attorney, Agent, or Firm*—Armstrong Teasdale LLP

(57) ABSTRACT

A system for structural assessment is described that comprises a plurality of sensors and a surface covering for at least a portion of a structure. The sensors are arranged in a pattern and attached to the surface covering. The surface covering is attached to a surface of a structure, and the sensors are configured to provide signals relating to the integrity of the structure to an external device.

19 Claims, 4 Drawing Sheets

OTHER PUBLICATIONS

Eastham, J., Abstract of GB2194062, Feb. 24, 1988.*
Drechsler et al., Abstract of EP0538580, Apr. 28, 1993.*
Patterson I.F., Abstract of GB2107213, Apr. 27, 1983.*
Brassier et al., Abstract of WO2005045045389, May 19, 2005.*
"Coating." Webster's third New International® Dictionary, Unabridged. Merriam-Webster, Inc. 1993.*
"Applique." Webster's third New International® Dictionary, unabridged. Merriam-Webster, Inc. 1993.*
"Covering." Webster's third New International® Dictionary, Unabridged. Merriam-Webster, Inc. 1993.*
M. Lin et al. "Built-in structural diagnostic with the Smart Layer and Smart Suitcase". Smart Materials Bulletin. vol. 2001, Issue 4, Apr. 2001, pp. 7-11.*
L. Ye et al. "Functionalized composite structures for new generation airframes: a review," Composites Science and Technology. vol. 65, Issue 9. Jul. 2005, pp. 1436-1446.*
M. Lemistre et al. "Simulation of an Electromagnetic Health Monitoring Concept for Composite Materials. Comparison with Experimental Data." Smart Nondustructive Evaluation and Health Monitoring of Structual and Biological Systems II, Proceedings of SPIE. vol. 5047. 2003. pp. 130-139.*
Dr. Guy Davis, Corrosion Protection and Monitoring Using Appliques with Embedded Corrosion Sensors, http://www.mdatechnology.net/techsearch.asp?articleid=621, Jul. 14, 2004, 3 pgs, Columbia, MD.

* cited by examiner

METHODS AND SYSTEMS FOR USING ACTIVE SURFACE COVERINGS FOR STRUCTURAL ASSESSMENT AND MONITORING

BACKGROUND OF THE INVENTION

This invention relates generally to assessment and monitoring of structures and more specifically, to methods and systems for using active surface coverings for structural assessment and monitoring.

Composite materials are increasingly utilized in a wide variety of applications, including for aircraft structures. Multi-functional systems using composite material having complex geometries, however, can be a maintenance burden for servicing personnel. In addition, the maintenance tools, procedures, and practices for metallic aircraft structures generally are not compatible or cost effective with composite aircraft structures. Composite aircraft structures include mixtures of bonded and bolted laminates with a variety of metallic and composite substructures. Other examples include composite sandwiched structures and other adhesive bonded panels including assemblies and structures with contoured surfaces. It is desirable to inspect such structures to identify any defects, such as cracks, discontinuities, voids, or porosity, which could adversely affect the performance of the structure.

With respect to inspecting aircraft structure, in-service structural health monitoring (SHM) sensors are often part of a permanently installed system that includes other electronic hardware. Such other hardware takes up space, is heavy, and is typically mounted and wired into position on an aircraft. Known SHM sensors typically also require energization from a power source during operation. Space, weight, and power consumption factors are continually examined for reduction in aircraft design and configuration.

Non-destructive evaluation (NDE) sensors are generally placed by hand onto a structure under inspection by an inspector. Such inspectors typically do not have easy access to all the locations, for example, on an airframe, that might require inspection. Often, at least a portion of such structures has to be removed in order to inspect it, or secondary structures adjacent to the structure to be inspected. In addition to the time consuming and labor intensive aspect of NDE, there is also a danger of damaging an aircraft component or structure in connection with such NDE. NDE may be performed during personnel training sessions, field testing of the composite product, or after the completed structure has been put into service to validate integrity and fitness of the structure. NDE is sometimes referred to as non-destructive inspection (NDI).

Utilization of composite structures and a continuing shift towards lightweight composite and bonded materials, dictate that devices and processes are made available to ensure structural integrity, production quality, and lifecycle support. However, known non-destructive evaluation and non-destructive inspection methods still utilize sensors that are temporarily placed on to the exterior surface or an interior surface of a structure in order to accomplish the inspection. The time and labor costs associated with placement of these sensors is not insignificant. In addition, temporary placement of sensors and sensor grids may result in incorrect placement for the tests that are to be performed.

BRIEF DESCRIPTION OF THE INVENTION

In one aspect, a system for structural assessment is provided. The system includes a plurality of sensors and a surface covering for at least a portion of a structure. The sensors are arranged in a pattern and attached to the surface covering which is attached to a surface of a structure. The sensors are configured to provide signals relating to the integrity of the structure to an external device.

In another aspect, a surface covering for a structure is provided. The surface covering includes a layer of surface covering material, an adhesive backing attached to the layer of surface covering material, a plurality of nondestructive evaluation sensors arranged in a pattern and attached to the layer of surface covering material, and an indicator material configured to indicate one or phenomena occurring with respect to a structure to which the surface covering is attached.

In still another aspect, a method for structural assessment and monitoring of a structure is provided. The method includes providing at least one layer of material that includes a plurality of sensors attached thereto, utilizing at least one layer of material and plurality of sensors as a coating for the structure, and configuring the plurality of sensors to output signals indicative of some aspect of the integrity of the structure.

DETAILED DESCRIPTION OF THE INVENTION

Embodiments of an active surface covering, referred to herein as appliqué which, in addition to providing a replacement for paint or other coatings, also provide nondestructive evaluation (NDE) and nondestructive inspection (NDI) testing capabilities are described herein. As a replacement for paint and other coatings, an active surface covering and provides protection capabilities for the structures to which the active surface covering is affixed.

Figure 1:
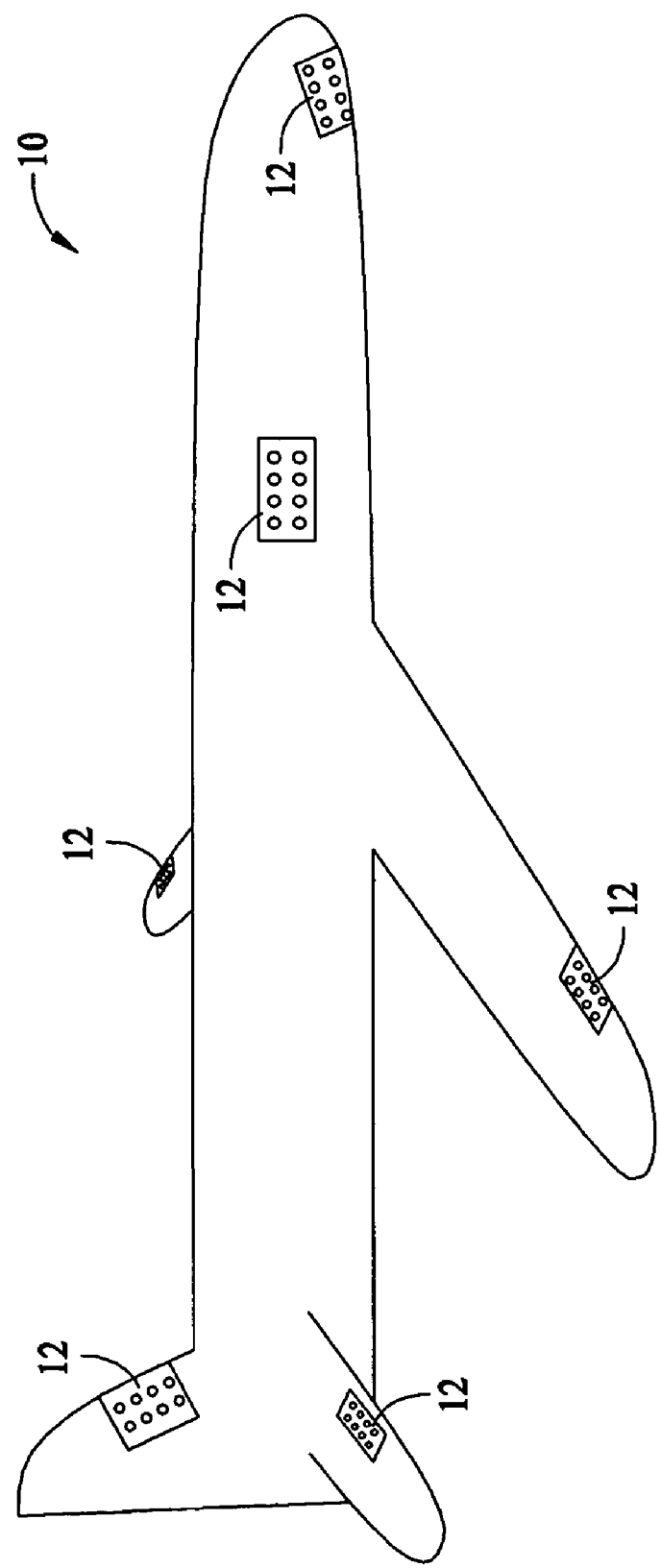
FIG. 1 is an illustration of an aircraft having several sheets of active appliqué applied thereto.

FIG. 1 is a diagram of an aircraft 10 that includes several sheets of appliqué 12, sometimes referred to herein as active appliqué, attached thereto. In various embodiments, active appliqué 12 is configured as thin plastic or elastomer sheets having an adhesive backing. While described herein as plastic or elastomer, it is to be understood that the sheets of active appliqué 12 may be fabricated from one or more bonded layers of any organic, metallic, synthetic or polymer based material. Sheets of active appliqué 12 can be cut to fit and affixed to the surface of a structure, for example, aircraft 10. Generally, sheets of appliqué 12 weigh less than paint, and are easily repaired or replaced with less expense than the expenses associated with paint repair or replacement.

In one embodiment described herein, appliqué 12 is fabricated to include a grid of piezo-electric sensors. In other embodiments, active appliqué 12 is fabricated to include one or more substrate layers for use in lightning strike protection (LSP) applications by integrating conductive media into these layers or onto the appliqué material. In still other embodiments, active appliqué 12 may be configured to include one or more of RF antennas, RFID tags, materials that change color upon an impact (e.g., bruisable paint), and other sensing devices that may be incorporated into an appliqué while providing a sensing or communication capability.

Referring again to FIG. 1, active appliqué 12 is affixed to portions of aircraft 10 where, for example, monitoring of impacts and other structural monitoring is desired utilizing sensors embedded within appliqué 12. Such structural monitoring may be a part of the maintenance plan for the structure. The sensors are capable of detecting a flaw on or within the structure of aircraft 10. In one embodiment, to test the structure of aircraft 10, an impact mechanism is used to generate stress waves along the surface of the structure and within the structure. In this test, the sensors are capable of detecting the stress waves in order to determine whether a flaw or other anomaly is present within the structure. The structure to be tested could be any number of materials. For example, and with respect to aircraft 10, structure could be fabricated from a metallic material such as aluminum, or composite materials such as graphite-epoxy.

Figure 2:
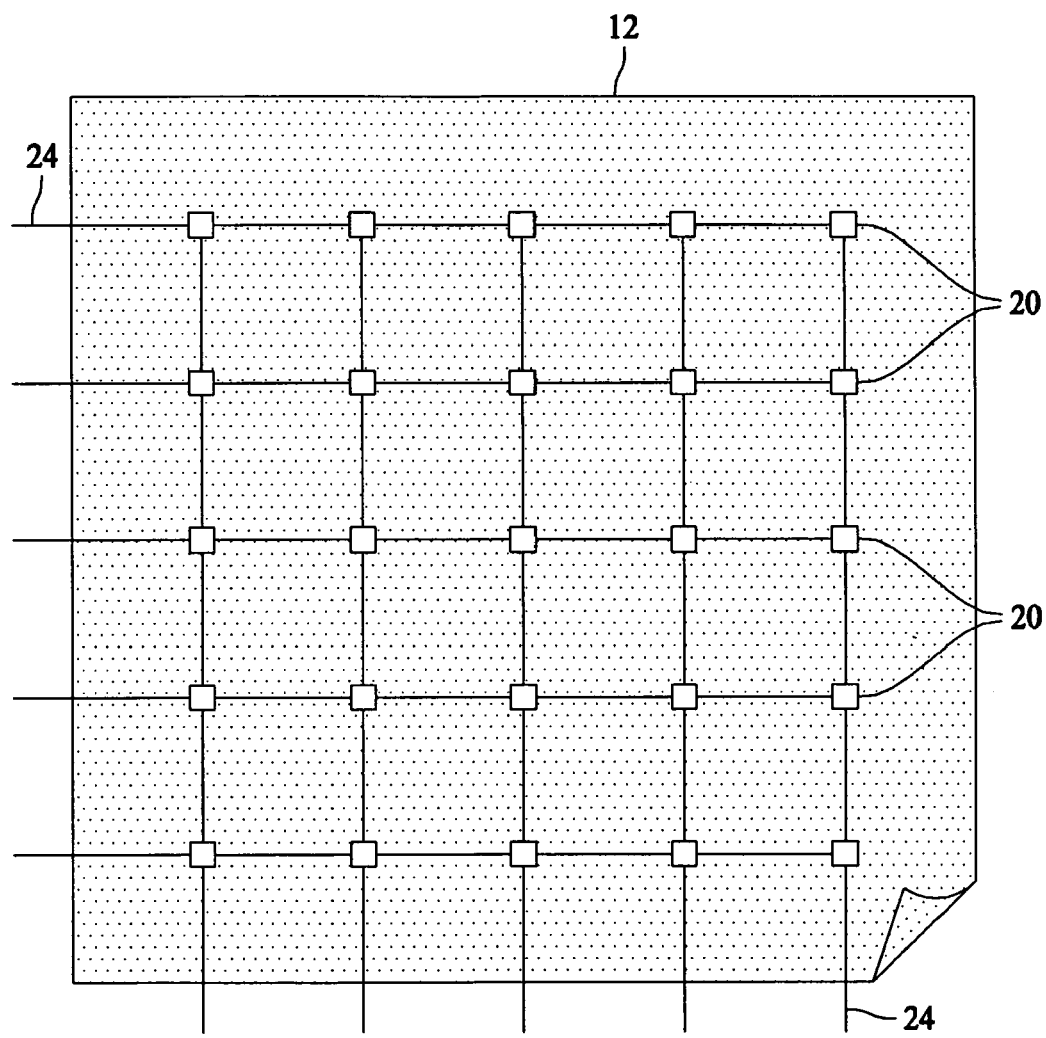
FIG. 2 is a diagram illustrating one example of active appliqué, the appliqué containing a grid of piezo-electric sensors.

FIG. 2 is an illustration of a sheet of active appliqué 12. In the embodiment illustrated, active appliqué 12 contains a grid of sensors 20, for example, thin piezo-electric sensors located within a thin sheet of material 12. The sensors 20 can be utilized to locate and determine a size of impacts on a surface of a structure, for example, using time-based triangulation techniques. In one particular embodiment, an impact location and size of impact is determined by time-of-stress wave travel to the various individual sensors 20, and by the amplitude of the stress wave each sensor 20 experiences. In such an embodiment, sensors 20 may be electrically connected using a conductive ribbon 14 (not shown) within appliqué 12, or as further described below, integrated with one or more RFID tags to provide data storage and wireless communication relating to impact location of impact, size of impact, and any internal damages to the structure. In other embodiments, current paths to and from each sensor 20 are formed with one or more of metallic deposition, etching, or bonding. Also, wires 24 may be attached to the material 12 to provide the current paths.

In any of the above described configurations, active appliqué 12 is utilized to locate and size such damages that may occur with use of composite or metal structures, including, but not limited to, delaminations, disbonds, degradation, corrosion, or cracking on the surface or subsurface of structures such as aircraft 10. Information from sensors 20 is input into, for example, a portable data acquisition unit (not shown) that is capable of recording electrical inputs produced by stress waves passing through each sensor 20. Material 22 is typically a non-conductive sheet that is flexible and pliable, for example, a thin polymeric or synthetic material having multiple layers. While illustrated as having sensors 20 in a grid pattern it is to be understood that sensors 20 may be arranged in any number of configurations within the sheet of material 22, as applicable for the structure being tested or monitored. The number, or arrangement, of sensors 20 within a sheet of active appliqué 12 may be varied depending on the size of the flaw to be detected in or on the structure. The number, or arrangement, of sensors within a sheet of active appliqué may also be varied to achieve a particular resolution for the structural test.

While described herein in the context of piezo-electric sensors 20, various embodiments of active appliqué includes one or more other types of thin nondestructive evaluation (NDE) or nondestructive inspection (NDI) sensors including one or more of piezo-electric sensors, strain sensors, eddy current sensors, capacitive sensors, resonance sensors, pulse echo sensors, mechanical impedance sensors, ultrasonic sensors, vibration sensors, temperature sensors, moisture sensors and other similarly configured sensors. As illustrated in FIG. 1, active appliqué 12 can be applied to regions having potentially high numbers of impacts from foreign objects, remote or difficult to inspect regions, or regions where degradation (corrosion, cracking, etc.) is expected or has been noted. Also, active appliqué 12 can be placed over structural repairs to allow for future inspection and/or continuing monitoring of the structural repairs. Further active appliqué 12 may also be placed onto structures undergoing mechanical testing, wind tunnel testing, flight testing or other monitoring to provide invaluable test data to designers of such structures.

Figure 3:
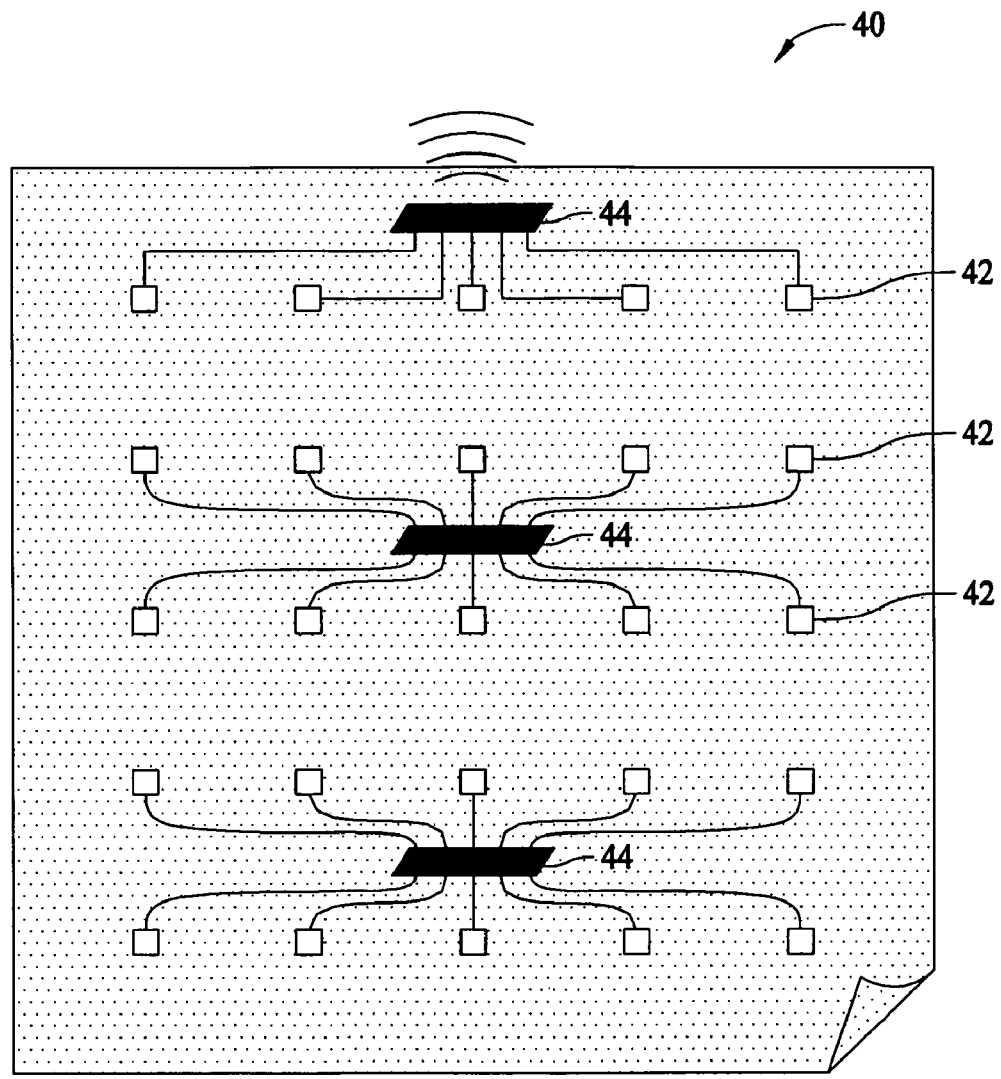
FIG. 3 is a diagram of active appliqué containing a grid of piezo-electric sensors, groupings of piezo-electric sensors communicatively coupled to an RFID device.

As described above, in an alternative embodiment, a wireless form of active appliqué incorporating RFID tags is also provided. FIG. 3 is an illustration of one embodiment of active appliqué 40 configured for wireless communication. Specifically, active appliqué 40 includes one or more NDE/NDI sensors 42 (i.e., piezo-electric sensors, strain sensors, eddy current sensors, capacitive sensors, vibration sensors, temperature sensors, moisture sensors and others), subsets of which are connected to radio-frequency identification (RFID) tags 44. The combination of sensors 42 and RFID tags 44 provide both a methodology for in-service NDE/NDI of critical aircraft structures that is based upon the integration of RFID tags 44 with NDE sensors 42. Further provided is a structure that is configured for utilization as a protective coating for at least a portion of an airframe or other structure. RFID tags 44 store stress wave information received from sensors 42 and are wirelessly interrogated using an RF transceiver (not shown in FIG. 3). RFID tags 44 include a read and write capability and are capable of collecting and holding data until requested by a receiver.

Additionally, RFID tags 44 provide an additional sensing capability. For example, should one of RFID tags 44 undergo a compression or other type of physical strain, the signal properties of its transmitted signal will change, for example, the signal transmission from an altered RFID tag 44 might occur at a different frequency. When a receiver of signals from RFID tags 44 determines that a frequency of transmission from an individual RFID tag 44 has changes, a user will be alerted to further inspect the area at and around the individual RFID tag 44 for anomalies that might compromise the structure to which the RFID tag 44 is attached.

RFID tags 44 are integrated into appliqué 40 for wireless sensing, monitoring, and data retrieval of events associated with sensors 42. Although RFID tags 44 may be disabled when mounted directly to a conductive surface, alternative RFID tag configurations include RFID tags that utilize high magnetic permeability/low electrical conductivity material backing or a backing film made from nanocomposite magnetic material. The various embodiments of RFID tags 44 may be considered depending upon the individual application for appliqué 40. For example, for wireless metallic structural testing/monitoring, active appliqué may be configured with the nanocomposite magnetic material backing at RFID tag locations. Additionally, active appliqué may be configured with embedded conductive paths that act as wiring for sensors 42, if a wireless RFID approach is not chosen.

Figure 4:
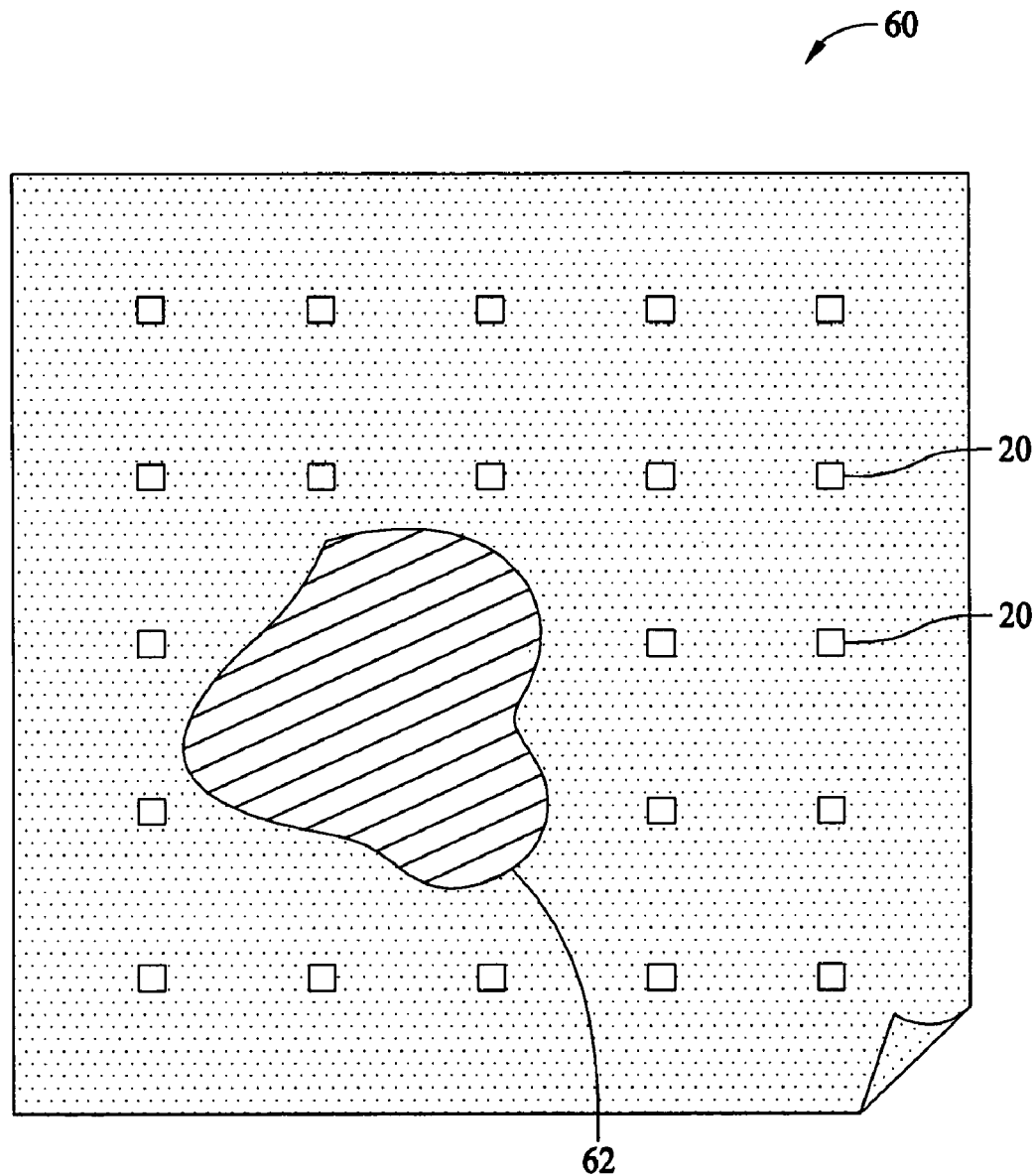
FIG. 4 is a diagram of active appliqué that is coated with one or more of an impact sensitive material, a strain sensitive material, and a heat sensitive material.

Besides being configured with discrete sensors, active appliqué can be coated with impact, strain, or heat sensitive material, which can give indications of various phenomena occurring at specific structural locations. FIG. 4 is an illustration of a sheet of active appliqué 60 that has been coated with one or more of the impact, strain, and heat sensitive material. In an alternative embodiment, rather than coating active appliqué 60 with such a material, the material is included as one of the layers of active appliqué 60. Active appliqué 60 includes sensors 20 as illustrated, and is further depicted as having an area 62 that has been impacted, strained or overheated. The type of visible information provided by active appliqué 60 is extremely valuable for assessing or monitoring a prototype, or flight test article, as well as for monitoring the fitness of the various structures associated with production aircraft. Also, other embodiments of active appliqué are utilized to control electrical properties at the surface of the structure, for example, not only as lightning strike protection, but also as a low observable coating or as an electrical shielding of vital component hardware or other systems underneath a sheet of such active appliqué. In certain embodiments, the low observable material and electrical shielding material is included as a coating or as one of the layers of the active appliqué 60.

The embodiments of active appliqué described herein may be utilized in applications and industries other than those associated with airframe structural testing and monitoring, including, but not limited to, the roadway, bridge, and building infrastructure industries. For example, one or more of the embodiments of active appliqué described herein, with slight modifications, is capable of being wrapped around columns or other load-bearing structure to provide engineers with quick structural assessment capabilities during routine inspections or after a catastrophic event such as an earthquake. In these embodiments, the active appliqué may be coated with or fabricated using a strain sensitive material as described above that changes color or that includes fiducials that move apart under strain. These color changes and fiducials are visually observed or measured with a laser and impact testing is accomplished using the above described sensors within the appliqué. Instead of having to apply individual markers for optical or laser-based dimensional reference measurements on structures, active appliqué with multiple markers (e.g., color changes and fiducials) are applied to, and remain on structures, while being monitored and providing data over time.

Application of sensors, RFID tags, RF antennas, mechanical markers, and special coatings to aircraft and other structures utilizing appliqué is a practical and workable alternative to paint or other traditional coatings. In these aircraft applications, active appliqué that is more or less permanently affixed to an aircraft structure allows for weight savings and wiring reductions from the existing structural health monitoring and integrated vehicle health monitoring approaches while still providing the capabilities of these structural monitoring approaches. The above described embodiments of active appliqué also reduce corrosion in metallic structures and reduces the cost of inspecting, testing, and monitoring. The active appliqué also provides remote NDE in critical areas, and supports vehicle testing and analysis for new, repaired, or prototype systems. With continuing advances being made with RFID technology, improvements in wireless maintenance approaches will be achieved through utilization of active appliqué.

The ability to quickly identify, predict, monitor and manage various structural anomalies instills customer confidence in products that incorporate active appliqué. In addition, increased safety and user confidence in the critical structures results, as well as, reduced monitoring and inspection costs of these critical structures.

While the invention has been described in terms of various specific embodiments, those skilled in the art will recognize that the invention can be practiced with modification within the spirit and scope of the claims.

What is claimed is:

1. A system for structural assessment comprising:
a plurality of sensors; and
a surface covering for at least a portion of a structure, said sensors arranged in a pattern and attached to said surface covering, said surface covering attached to a surface of the structure and configured to provide protection capabilities for portions of the structure to which it is affixed, said sensors networked to locate and size impacts on the surface of the structure, said sensors configured to provide signals relating to the integrity of the structure to an external device, said surface covering comprising a plurality of layers, said surface covering further comprising at least one of a coating and at least one layer of at least one of an impact sensitive material, a strain sensitive material, a heat sensitive material, a low observable material and an electrical shielding material.

2. A system according to claim 1 further comprising a plurality of RFID tags attached to said surface covering, each said RFID tag integrated with one or more of said sensors to provide wireless interrogation and collection of data received from said sensors.

3. A system according to claim 1 wherein said sensors comprise one or more of RFID tags, piezo-electric sensors, strain sensors, eddy current sensors, capacitive sensors, resonance sensors, pulse echo sensors, mechanical impedance sensors, vibration sensors, temperature sensors, moisture sensors and ultrasonic sensors.

4. A system according to claim 1 wherein said sensors are operable for assessing anomalies below the surface of the structure.

5. A system according to claim 4 wherein said inspection system is configured to provide inspection of the structure utilizing triangulation based on data from a plurality of said sensors.

6. A system according to claim 1 further comprising a data acquisition unit capable of recording inputs produced by stress waves passing through each of the plurality of said sensors.

7. A system according to claim 1 wherein said surface covering comprises an appliqué.

8. A system according to claim 1 wherein said sensors are located between two of said layers.

9. A surface covering for a structure comprising:
a layer of surface covering material;
an adhesive backing attached to said layer of surface covering material;
a plurality of nondestructive evaluation sensors arranged in a pattern and attached to said layer of surface covering material, said sensors networked to locate and size impacts on a surface of the structure; and
an indicator material configured to indicate one or more phenomena occurring with respect to the structure to which said surface covering is attached.

10. A surface covering according to claim 9 further comprising at least one RFID tag integrated with one or more of said sensors to provide wireless interrogation and collection of data from said nondestructive evaluation sensors.

11. A surface covering according to claim 9 wherein said sensors comprise one or more of RFID tags, piezo-electric sensors, strain sensors, eddy current sensors, capacitive sensors, resonance sensors, pulse echo sensors, mechanical impedance sensors, vibration sensors, temperature sensors, moisture sensors and ultrasonic sensors.

12. A surface covering according to claim 9 wherein said sensors are further operable for assessing anomalies below the surface of the structure.

13. A surface covering according to claim 12 said sensors configured to produce signals based on stress waves passing through each of the plurality of said sensors.

14. A surface covering according to claim 9 wherein said indicator material comprises a coating or layer of at least one of an impact sensitive material, a strain sensitive material, a heat sensitive material, a low observable material and an electrical shielding material.

15. A surface covering according to claim 9 wherein said layer of surface covering material comprises a plurality of bonded layers.

16. A method for structural assessment and monitoring of a structure comprising:
   providing at least one layer of material that includes a plurality of sensors attached thereto;
   utilizing the at least one layer of material and plurality of sensors as a surface coating for the structure, the at least one layer of material configured to provide protection capabilities for portions of the structure to which it is affixed;
   networking the sensors to locate and determine a size of impacts on the surface of the structure;
   configuring the plurality of sensors to output signals indicative of an integrity of the structure; and
   providing at least one of an additional layer and a coating capable of indicating one or more phenomena occurring with respect to the structure to which the at least one of an additional layer and a coating is attached.

17. A method according to claim 16 wherein providing at least one of an additional layer and a coating comprises providing a coating or layer of at least one of an impact sensitive material, a strain sensitive material, a heat sensitive material, a low observable material and an electrical shielding material.

18. A method according to claim 16 further comprising integrating at least one RFID tag with one or more of the sensors to provide wireless interrogation and collection of data from the sensors.

19. A method according to claim 16 wherein providing at least one layer of material that includes a plurality of sensors comprises attaching one or more of RFID tags, piezo-electric sensors, strain sensors, eddy current sensors, capacitive sensors, resonance sensors, pulse echo sensors, mechanical impedance sensors, vibration sensors, temperature sensors, moisture sensors and ultrasonic sensors to the layer of material.

* * * * *